US010169449B2

(12) United States Patent
Lu et al.

(10) Patent No.: US 10,169,449 B2
(45) Date of Patent: Jan. 1, 2019

(54) METHOD, APPARATUS, AND SERVER FOR ACQUIRING RECOMMENDED TOPIC

(71) Applicant: TENCENT TECHNOLOGY (SHENZHEN) COMPANY LIMITED, Shenzhen (CN)

(72) Inventors: Ke Lu, Shenzhen (CN); Qiang Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 732 days.

(21) Appl. No.: 14/735,136

(22) Filed: Jun. 10, 2015

(65) Prior Publication Data

US 2015/0278345 A1   Oct. 1, 2015

Related U.S. Application Data

(63) Continuation of application No. PCT/CN2013/084026, filed on Sep. 23, 2013.

(30) Foreign Application Priority Data

Dec. 10, 2012 (CN) .......................... 2012 1 0528164

(51) Int. Cl.
   G06F 17/30   (2006.01)
   G06F 17/22   (2006.01)

(52) U.S. Cl.
   CPC .... G06F 17/30648 (2013.01); G06F 17/2235 (2013.01); G06F 17/30882 (2013.01)

(58) Field of Classification Search
   CPC .................. G06F 17/30554; G06F 17/30864
   See application file for complete search history.

(56) References Cited

U.S. PATENT DOCUMENTS 5,442,781 A * 8/1995 Yamagata ........... G06F 17/3064
                                                          707/779
6,691,103 B1 * 2/2004 Wozny .............. G06F 17/30424
(Continued)

FOREIGN PATENT DOCUMENTS

CN      101847160 A   9/2010
CN      102591948 A   7/2012
(Continued)

OTHER PUBLICATIONS

The World Intellectual Property Organization (WIPO) International Search Report for PCT/CN2013/084026 dated Dec. 26, 2013.
The State Intellectual Property Office of the People's Republic of China (SIPO) Office Action 1 for 201210528164.2 dated Jan. 5, 2018 8 Pages (including translation).

*Primary Examiner* — Scott T Baderman
*Assistant Examiner* — Mario M Velez-Lopez
(74) *Attorney, Agent, or Firm* — Anova Law Group, PLLC

(57) ABSTRACT

The present disclosure discloses a method, apparatus, server, and storage medium for acquiring a recommended topic, and relates to the field of network technologies. The method includes: acquiring, according to a link of a current page, a recommended topic associated with a topic of the current page; and displaying the recommended topic on the current page. By using technical solutions provided in embodiments of the present invention, a recommended topic associated with a topic is acquired by using a page link as an index, which, however, is not limited to a page related to the topic, thereby achieving an objective of extending to other topics, expanding a browsing range, and making full use of a network to provide more services for a user.

17 Claims, 3 Drawing Sheets

(56) References Cited

U.S. PATENT DOCUMENTS

| | | | | |
|---|---|---|---|---|
| 8,161,043 B2* | 4/2012 | Tsuzuki | ............ | G06F 17/30672 707/730 |
| 8,892,584 B1* | 11/2014 | Mao | ................. | G06F 17/30896 704/10 |
| 9,146,999 B2* | 9/2015 | Suzuki | ............... | G06F 17/30867 |
| 9,418,102 B2* | 8/2016 | Inoue | ................ | G06F 17/30389 |
| 9,582,835 B2* | 2/2017 | Yoon | ....................... | G06Q 10/10 |
| 9,613,012 B2* | 4/2017 | Roy | ........................ | G06F 17/27 |
| 9,788,070 B2* | 10/2017 | Narahara | ............... | H04H 60/31 |
| 2007/0078832 A1* | 4/2007 | Ott, IV | ............. | G06F 17/30867 |
| 2008/0082477 A1* | 4/2008 | Dominowska | .... | G06F 17/30616 |
| 2008/0104030 A1* | 5/2008 | Choi | ................. | G06F 17/30867 |
| 2011/0029559 A1* | 2/2011 | Kikuchi | ............ | G06F 17/30864 707/770 |
| 2011/0066624 A1* | 3/2011 | Turakhia | ........... | G06F 17/30864 707/748 |
| 2011/0225019 A1* | 9/2011 | Taylor | ................ | G06F 17/30864 705/7.28 |
| 2014/0331142 A1* | 11/2014 | Li | ...................... | G06F 17/30899 715/738 |
| 2015/0066908 A1* | 3/2015 | Chang | ............... | G06F 17/30554 707/722 |
| 2015/0201040 A1* | 7/2015 | Horling | ............... | H04L 67/1095 709/203 |

FOREIGN PATENT DOCUMENTS

| | | |
|---|---|---|
| CN | 102693248 A | 9/2012 |
| CN | 103389975 A | 11/2013 |

\* cited by examiner

METHOD, APPARATUS, AND SERVER FOR ACQUIRING RECOMMENDED TOPIC

CROSS-REFERENCES TO RELATED APPLICATIONS

This application is a continuation of PCT Application No. PCT/CN2013/084026, filed on Sep. 23, 2013, which claims priority to Chinese Patent Application No. CN 201210528164.2, filed on Dec. 10, 2012, the entire content of all of which are incorporated herein by reference.

FIELD OF THE TECHNOLOGY

The present disclosure generally relates to the field of network technologies and, more particularly, relates to a method, apparatus, server, and storage medium for acquiring a recommended topic.

BACKGROUND OF THE DISCLOSURE

As network technologies develop, currently websites like blogging and e-commerce may provide recommendations of topic-related content. A process of implementing the recommendations of topic-related content generally includes that: when a user browses a page, a system finds, according to a title and a main body of a current page and by means of a document similarity calculation, other pages in the system that are similar to the current page, then ranks the pages with reference to factors such as popularity and quality of the pages, and recommends top-ranking pages to the user as topic-related content.

However, when topic-related content is to be recommended, the recommendation range is limited by the topic. For example, only page(s) within a website or on the network that involve the topic can be recommended, and the recommendation is therefore limited and cannot extend to other different topics, which limits a browsing range of a user, and cannot make full use of the network to provide more services for the user.

SUMMARY

To solve a problem of the existing technology, embodiments of the present invention provide a method, apparatus, server, and storage medium for acquiring a recommended topic. The technical solutions are as follows:

A method for acquiring a recommended topic includes:
acquiring, according to a link of a current page, a recommended topic associated with a topic of the current page by:
acquiring a first keyword having a first relevance to the link of the current page, wherein the first keyword having the first relevance is a keyword used when the current page is a clicked search result, acquiring a second keyword having a second relevance to the link of the current page, wherein the second keyword having the second relevance is a keyword used when the current page is an unclicked search result, and using at least one of the acquired first and second keywords as the recommended topic associated with the topic of the current page; and
displaying the recommended topic on the current page.

An apparatus for acquiring a recommended topic includes:
a recommended topic acquiring module, configured to acquire, according to a link of a current page, a recommended topic associated with a topic of the current page, the recommended topic acquiring module including:
a first acquiring unit, configured to acquire a first keyword having a first relevance to the link of the current page, wherein the first keyword having the first relevance is a keyword used when the current page is a clicked search result, a second acquiring unit, configured to acquire a second keyword having a second relevance to the link of the current page, wherein the second keyword having the second relevance is a keyword used when the current page is an unclicked search result, and a determining unit, configured to use at least one of the acquired first and second keywords as the recommended topic associated with the topic of the current page; and
a display module, configured to display the recommended topic on the current page.

A non-transitory computer readable storage medium includes a computer readable program stored thereon. When being executed, the computer readable program causes one or more processors to implement a method for acquiring a recommended topic, the method including:
acquiring, according to a link of a current page, a recommended topic associated with a topic of the current page by:
acquiring a first keyword having a first relevance to the link of the current page, wherein the first keyword having the first relevance is a keyword used when the current page is a clicked search result, acquiring a second keyword having a second relevance to the link of the current page, wherein the second keyword having the second relevance is a keyword used when the current page is an unclicked search result, and using at least one of the acquired first and second keywords as the recommended topic associated with the topic of the current page; and
displaying the recommended topic on the current page.

A server includes the disclosed apparatus for acquiring a recommended topic.

The embodiments of the present invention provide a method, apparatus, server, and storage medium for acquiring a recommended topic, where: according to a link of a current page, a recommended topic associated with a topic of the current page is acquired, and the recommended topic is displayed on the current page.

By using the technical solutions provided in the embodiments of the present invention, a recommended topic associated with a topic is acquired by using a page link as an index, which, however, is not limited to a page related to the topic, thereby achieving an objective of extending to other topics, expanding a browsing range, and making full use of a network to provide more services for a user.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description merely show some embodiments of the present invention, and a person of ordinary skill in the art may still derive other drawings from these accompanying drawings without creative efforts.

DESCRIPTION OF EMBODIMENTS

To make the objective, technical solutions, and advantages of the present disclosure clearer, the following further describes the embodiments of the present invention in detail with reference to the accompanying drawings.

Figure 1:
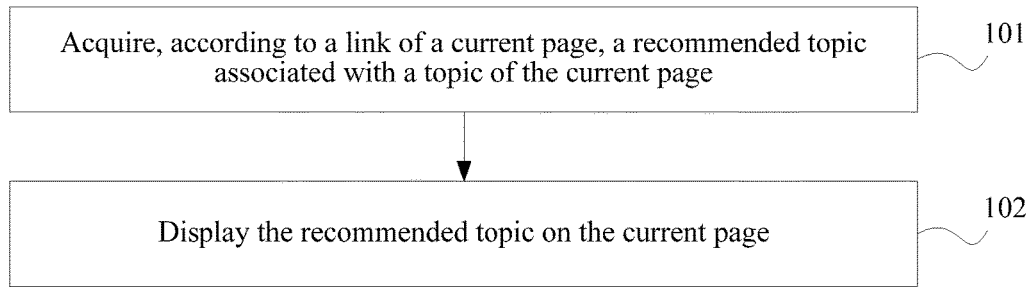
FIG. 1 illustrates a flowchart of a method for acquiring a recommended topic according to an embodiment of the present invention.

FIG. 1 is a flowchart of a method for acquiring a recommended topic according to an embodiment of the present invention. Referring to FIG. 1, the method includes:

101. Acquiring, according to a link of a current page, a recommended topic associated with a topic of the current page.

The current page may refer to a post in a forum scenario, or an article in a blog, or a web page in another website, or the like, and the topic of the current page may refer to title information of the current page, such as a post title.

102. Displaying the recommended topic on the current page.

Specifically, the recommended topic is displayed in a specified area of the current page, and there may be one or more recommended topics, which is not limited in this embodiment of the present invention.

By using the technical solution provided in this embodiment of the present invention, a recommended topic associated with a topic is acquired by using a page link as an index, which, however, is not limited to a page related to the topic, thereby achieving an objective of extending to other topics, expanding a browsing range, and making full use of a network to provide more services for a user.

Optionally, based on the technical solution of the embodiment shown in FIG. 1, step 101 "Acquiring, according to a link of a current page, a recommended topic associated with a topic of the current page" includes step 101B and at least one of step 101A1 to step 101A4.

101A1. Acquiring a first keyword having a first relevance to the link of the current page, where the first keyword having the first relevance is a keyword that is used when the current page is a clicked search result.

101A2. Acquiring a second keyword having a second relevance to the link of the current page, where the second keyword having the second relevance is a keyword that is used when the current page is an unclicked search result.

The first keyword having the first relevance and the second keyword having the second relevance are obtained according to a search history stored by a server and a browsing behavior of a user.

The first keyword having the first relevance is a keyword that is used when the current page is a clicked search result. When a keyword is used to perform a search, multiple search results are obtained, and it is determined that the keyword is a keyword that has the first relevance and is associated with a link of a page of a search result clicked, that is, browsed, by a user.

The second keyword having the second relevance is a keyword that is used when the current page is an unclicked search result. When a keyword is used to perform a search, multiple search results are obtained, and it is determined that the keyword is a keyword that has the second relevance and is associated with a link of a page of an unclicked search result, that is, not browsed, by a user.

101A3. Acquiring a third keyword having a third relevance to the link of the current page, where the third keyword having the third relevance is a recommended topic of a page related to the current page.

In this embodiment of the present invention, for the pages, each page has a recommended topic thereof, and for each page, according to the existing technology, if a related page may be obtained, a recommended topic of the related page may be acquired, to function as the third keyword having the third relevance to the link of the current page.

101A4. Acquiring a fourth keyword having a fourth relevance to the current page, where the fourth keyword having the fourth relevance is a keyword in content of the current page.

In this embodiment of the present invention, for the pages, page content thereof may be analyzed, to acquire a keyword in the content, and a keyword in the content of the current page is used as the fourth keyword having the fourth relevance to the link of the current page.

In step 101A1 to step 101A4, the server saves, according to the search history, the page link and a correspondence between the page link and keywords having the first relevance and the second relevance to the page link. Therefore, a first keyword having the first relevance to the link of the current page and a second keyword having the second relevance to the link of the current page may be acquired according to the correspondence. Preferably, the first keyword having the first relevance to the link of the current page may also be acquired first; when the number of keywords having the first relevance reaches a preset value, step 101B is performed; when the number of keywords having the first relevance does not reach the preset value, the second keyword having the second relevance to the link of the current page is acquired, and when a sum of the number of the keywords having the first relevance and the number of the keywords having the second relevance reaches the preset value, step 101B is performed, while if the sum does not reach the preset value, step 101A3 is performed; and if the sum of the numbers of the keywords acquired through step 101A1 to step 101A3 reaches the preset value, step 101B is performed, while if the sum does not reach the preset value, step 101A4 is performed.

101B. Using the acquired first keyword and/or the acquired second keyword as the recommended topic associated with the topic of the current page.

In this case, the acquired keyword may include the keyword obtained in any one of step 101A1 to step 101A4.

Further optionally, based on the technical solution of the embodiment shown in FIG. 1, step 101A3 "Acquiring a third keyword having a third relevance to the link of the current page" includes: acquiring a recommended topic of a page related to the current page, and using the recommended topic of the related page as the third keyword having the third relevance to the link of the current page.

The page related to the current page refers to a page related to a subject term or page content of the current page. It may be learned by a person skilled in the art that the related page may be acquired according to subject term matching or an association relationship of page tags, and details are not further described herein. For the related page, a recommended topic may be acquired according to a page link of the related page; therefore, the recommended topic of the related page may be acquired according to the page link of the related page. The recommended topic of the related page is acquired according to an association relationship between pages, so that a source of the recommended topic can be further expanded, and a more comprehensive recommendation can be provided for a user by mining the related page.

By using the technical solution provided in this embodiment of the present invention, a recommended topic associated with a topic is acquired by using a page link as an index, which, however, is not limited to a page related to the topic, thereby achieving an objective of extending to other topics, expanding a browsing range, and making full use of a network to provide more services for a user. Further, subject terms related to a page that are obtained based on mining of the browsing behavior and a search behavior of the user cannot cover all pages after all, and an unpopular page is rarely browsed and found by the user. This problem exists especially for a newly added page, and subject terms of the page cannot be acquired according to the browsing behavior and the search behavior of the user. To reduce a probability that no subject term is recommended, a recommendation of a page related to the current page is used to supplement the recommended topic of the current page.

Further optionally, based on the technical solution of the embodiment shown in FIG. 1, step 101A4 "Acquiring a fourth keyword having a fourth relevance to the current page" includes: extracting the keyword in the content of the current page according to a preset rule, and using the extracted keyword as the fourth keyword having the fourth relevance to the current page. For a post without clicking by the user or the search behavior of the user, in addition to using a recommended topic of a page related to the post as a supplement, the recommended topic of the current page may further be supplemented by extracting a keyword from the content of the current page. The keyword of the page content may be extracted according to the following rule: performing word segmentation on a page title and content, to acquire a word segmentation result; and performing ranking according to TF*idf of words in the word segmentation result, where a high TF*idf word>a low TF*idf word. Words in the word segmentation result that have same TF*idf are ranked according to parts of speech, where a noun>a verb>an adjective. Words in the word segmentation result that have a same part of speech are ranked according to lengths, where a long word>a short word. According to an actual condition of the page, three to five words in the word segmentation result that rank top and synonyms and extended words thereof are selected as keywords of the page content. It can be learned by a person skilled in the art that a site TF*idf is used to evaluate importance of one word to one file in a fileset or a text corpus. Importance of a word increases in direct proportion to the number of occurrences of the word in a single document, but decreases in inverse proportion to frequency of occurrence of the word in the text corpus.

Optionally, based on the technical solution of the embodiment shown in FIG. 1, step 101B "Using the acquired first keyword and/or the acquired second keyword as the recommended topic associated with the topic of the current page" includes: removing, from the acquired first and/or second keywords, repeated keywords and keywords having a similarity greater than a preset threshold, and using a remaining keyword as a recommended topic associated with the topic of the current page. By further screening the acquired keywords, accuracy and intuitiveness of recommendations for the user can be improved.

Optionally, based on the technical solution of the embodiment shown in FIG. 1, before step 101 "Acquiring, according to a link of a current page, a recommended topic associated with a topic of the current page", the method further includes: associating, when a search is performed according to a search keyword, the search keyword with a page link of a search result, and determining relevance between the search keyword and the page link of the search result. In website page browsing, quite a few pages are browsed by using a search engine. In addition, the search engine has a search keyword searched for by the user; and in this way, relevance between the search keyword and a page link is established, and such relevance is confirmed by the user (excluding misoperation), thereby ensuring high quality. When performing a search according to the search keyword, the user obtains multiple search results. Through the search process, the search results may be associated with the search keyword, and the multiple search results include a result that is clicked by the user and a result that is unclicked by the user. Therefore, relevance between the search keyword and a page link of a search result may further be determined according to whether the search result is clicked, so as to recommend, when topic recommendation is performed, a topic for the page according to a specific condition of a keyword associated with the page link.

Further optionally, based on the technical solution of the embodiment shown in FIG. 1, the associating, when a search is performed according to a search keyword, the search keyword with a page link of a search result, and determining relevance between the search keyword and the page link of the search result includes: associating, when a search is performed according to the search keyword, the search keyword with a page link that is clicked by a user in the search result, and determining that first relevance exists between the search keyword and the page link that is clicked by the user in the search result; and/or associating, when a search is performed according to the search keyword, the search keyword with a page link that is unclicked by a user in the search result, and determining that second relevance exists between the search keyword and the page link that is unclicked by the user in the search result, where the first relevance is higher than the second relevance.

In this embodiment, a search result clicked by the user may be deemed to be what the user has an interest in, and then it is determined that high relevance, that is, the first relevance, exists between a page link of the clicked search result and the search keyword. However, for an unclicked search result by the user, it is likely that the search result is not browsed by the user, and relevance may be deemed to be low; and then it is determined that low relevance, that is, the second relevance exists between a page link of the unclicked search result and the search keyword.

Further optionally, based on the technical solution of the embodiment shown in FIG. 1, the associating, when a search is performed according to a search keyword, the search keyword with a page link of a search result, and determining relevance between the search keyword and the page link of the search result includes: counting, for any page link, the number of search keywords associated with the page link, removing repeated search keywords and/or search keywords having a similarity greater than a preset threshold, and determining relevance between a remaining search keyword and the page link. Any step of the following step (1), step (2), and step (3) may be included:

(1) Count, for any page link, the number of occurrences of search keywords associated with the page link, remove repeated search keywords, and determine relevance between a remaining search keyword and the page link.

In this embodiment, a search keyword for which relevance has been established may further be processed. For each page link, the number of occurrences of search keywords having the first relevance to the page link is counted, repeated search keywords are removed, and it is determined that a remaining search keyword is a first keyword having the first relevance to the page link. The number of occurrences of search keywords having the second relevance to the page link is counted, repeated search keywords are removed, and it is determined that a remaining search keyword is a second keyword having the second relevance to the page link.

(2) Count, for any page link, the number of search keywords associated with the page link, calculate similarities among the search keywords associated with the page link, remove search keywords having a similarity greater than a second preset threshold, and determine relevance between a remaining search keyword and the page link.

In this embodiment, a search keyword for which relevance has been established may further be processed. For each page link, for search keywords having the first relevance to the page link, similarities among the search keywords associated with the page link are calculated, search keywords having a similarity greater than a second preset threshold are removed, and it is determined that a remaining search keyword is a second keyword having the second relevance to the page link. For search keywords having the second relevance to the page link, similarities among the search keywords associated with the page link are calculated, search keywords having a similarity greater than a second preset threshold are removed, and it is determined that a remaining search keyword is a second keyword having the second relevance to the page link.

(3) Count, for any page link, the number of search keywords associated with the page link, remove repeated search keywords and/or search keywords having a similarity greater than a second preset threshold, and determine relevance between a remaining search keyword and the page link.

Step (3) is a combination of step (1) and step (2). It can be learned from the foregoing content that by screening search keywords that repeatedly occur and similarities, a search keyword having little association with a page can be removed, so that a keyword is more effectively and accurately associated with a page link, thereby improving accuracy of topic recommendation in a subsequent topic recommendation process.

It should be noted that all the preset values mentioned in this embodiment of the present invention can be set by a technician, and specific values thereof are not limited in this embodiment of the present invention.

This embodiment of the present invention provides a method for acquiring a recommended topic, where: according to a link of a current page, a recommended topic associated with a topic of the current page is acquired, and the recommended topic is displayed on the current page. By using the technical solution provided in this embodiment of the present invention, a recommended topic associated with a topic is acquired by using a page link as an index, which, however, is not limited to a page related to the topic, thereby achieving an objective of extending to other topics, expanding a browsing range, and making full use of a network to provide more services for a user.

Figure 2:
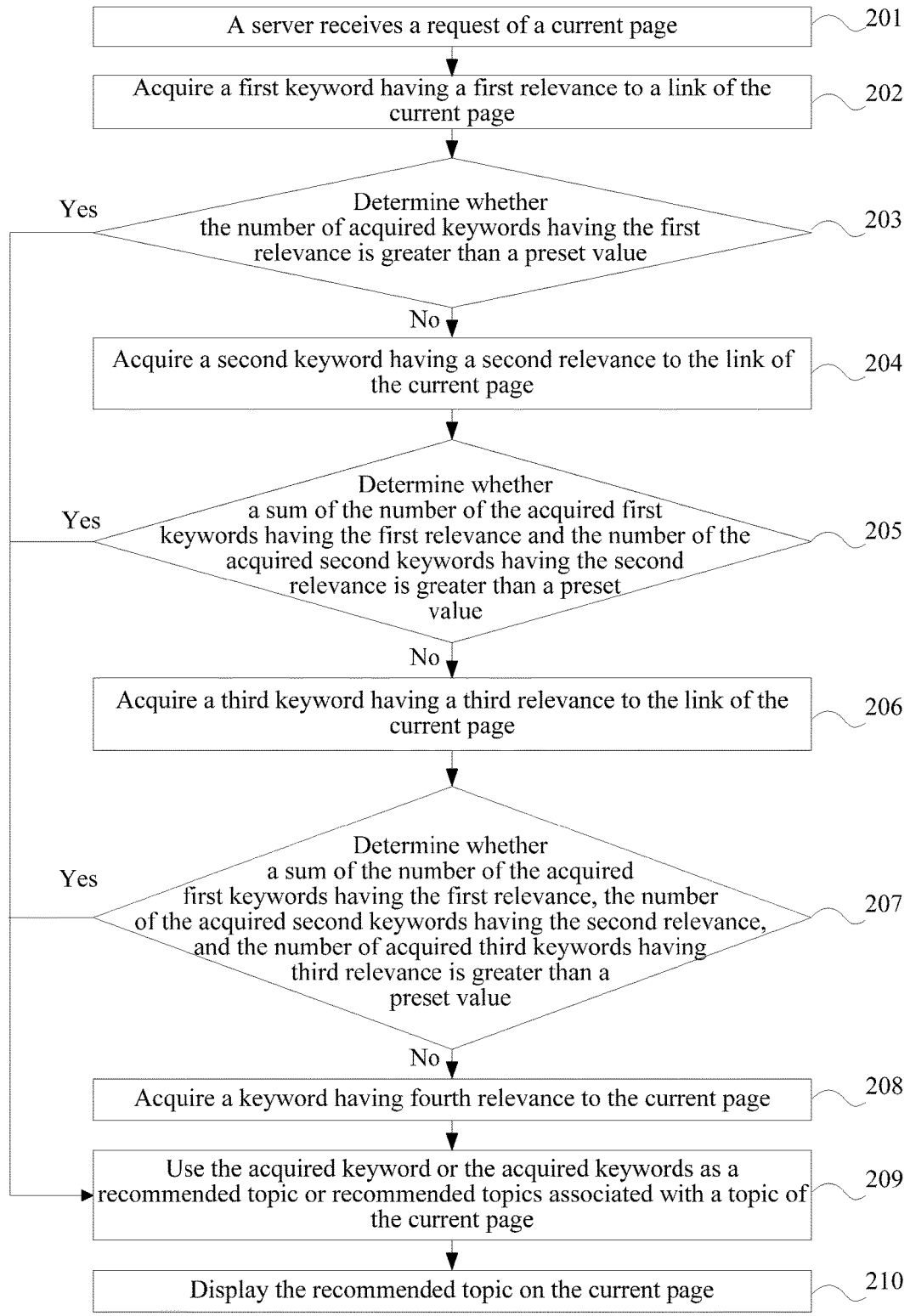
FIG. 2 illustrates a flowchart of a method for acquiring a recommended topic according to an embodiment of the present invention.

FIG. 2 is a flowchart of a method for acquiring a recommended topic according to an embodiment of the present invention. Any page in a forum browsed by a user is used as an example for description. Referring to FIG. 2, this embodiment specifically includes:

201. A server receives a request of a current page.

In this embodiment, the request may be a request for browsing the page, and the server may display the current page for a user according to the request. However, in another embodiment of the present invention, the request may be another request; for example, for a music online listening website, the request may be a request for listening to a piece of music corresponding to the current page.

The request carries a page identifier of the current page, such as a post ID, or a music ID.

202. Acquiring a first keyword having a first relevance to a link of the current page.

The first keyword having the first relevance is obtained through mining according to a browsing behavior of the user during a search.

203. Determining whether the number of acquired keywords having the first relevance is greater than a preset value, if yes, perform step 209, and if not, perform step 204.

The preset value may be the number of recommended topics required to be displayed on the web page, which may be set by a technician, or is adjusted by the user according to the browsing habit of the user.

204. Acquiring a second keyword having a second relevance to the link of the current page.

The second keyword having the second relevance is acquired according to a search behavior of the user.

205. Determining whether a sum of the number of the acquired keywords having the first relevance and the number of the acquired keywords having the second relevance is greater than a preset value, if yes, perform step 209, and if not, perform step 206.

206. Acquiring a third keyword having a third relevance to the link of the current page.

It should be noted that the first keyword having the first relevance and the second keyword having the second relevance may be generated, by using the subject terms mined by the browsing behavior and the search behavior of the user, when the user is off line, and the browsing behavior and the search behavior are not limited to behaviors of the current user, but are behaviors of multiple users obtained by using a search engine.

207. Determining whether a sum of the number of the acquired keywords having the first relevance, the number of the acquired keywords having the second relevance, and the number of acquired keywords having the third relevance is greater than a preset value, if yes, perform step 209, and if not, perform step 208.

208. Acquiring a fourth keyword having a fourth relevance to the current page.

The keyword of the current page is supplemented by using a keyword of a related page, thereby reducing a probability of no result.

209. Using the acquired first keyword and/or the acquired second keyword as a recommended topic associated with a topic of the current page.

210. Displaying the recommended topic on the current page.

The performing order of the foregoing steps of the method for acquiring a recommended topic according to this embodiment of the present invention is only an example, and the performing order may be properly adjusted according to an actual need.

In this embodiment, words that are obtained through mining by means of a behavior related to a link of a current page can better reflect a user requirement. In addition, because a search behavior is based on page content, if a page has no related content, a user cannot be led to the current page even in a manner of searching. Therefore, a search keyword is associated with a search result by means of a search behavior for subsequent recommendation, which, to some extent, reflects a topic of the page. Practice proves that a page recommendation topic mined by using this method can better attract a user, thereby obtaining more user clicks.

Figure 3:
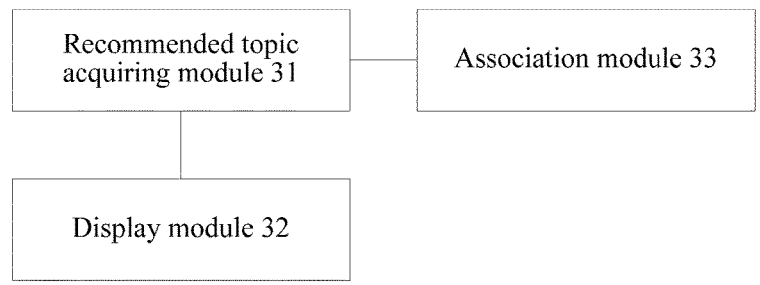
FIG. 3 illustrates a schematic structural diagram of an apparatus for acquiring a recommended topic according to an embodiment of the present invention.

FIG. 3 is a schematic structural diagram of an apparatus for acquiring a recommended topic according to an embodiment of the present invention. Referring to FIG. 3, the apparatus includes:

a recommended topic acquiring module 31, configured to acquire, according to a link of a current page, a recommended topic associated with a topic of the current page; and a display module 32, configured to display the recommended topic on the current page.

The recommended topic acquiring module 31 includes:

a first acquiring unit, configured to acquire a first keyword having a first relevance to the link of the current page, where the first keyword having the first relevance is a keyword that is used when the current page is a clicked search result; and/or a second acquiring unit, configured to acquire a second keyword having a second relevance to the link of the current page, where the second keyword having the second relevance is a keyword that is used when the current page is an unclicked search result; and/or a third acquiring unit, configured to acquire a third keyword having a third relevance to the link of the current page, where the third keyword having the third relevance is a recommended topic of a page related to the current page; and/or a fourth acquiring unit, configured to acquire a fourth keyword having a fourth relevance to the current page, where the fourth keyword having the fourth relevance is a keyword that is extracted from content of the current page according to a preset rule; and a determining unit, configured to use the acquired keyword or the acquired keywords as the recommended topic or the recommended topics associated with the topic of the current page.

The third acquiring unit is specifically configured to acquire the recommended topic of the page related to the current page, and use the recommended topic of the related page as the third keyword having the third relevance to the link of the current page.

The fourth acquiring unit is specifically configured to extract the keyword in the content of the current page according to a preset rule, and use the extracted keyword as the fourth keyword having the fourth relevance to the current page.

The determining unit is specifically configured to remove, from the acquired first and/or second keywords, repeated keywords and keywords having a similarity greater than a preset threshold, and use a remaining keyword as a recommended topic associated with the topic of the current page.

The apparatus further includes:

an association module 33, configured to associate, when a search is performed according to a search keyword, the search keyword with a page link of a search result, and determine relevance between the search keyword and the page link of the search result.

The association module 33 is specifically configured to associate, when a search is performed according to the search keyword, the search keyword with a page link that is clicked by a user in the search result, and determine that first relevance exists between the search keyword and the page link that is clicked by the user in the search result; and/or the association module 33 is configured to associate, when a search is performed according to the search keyword, the search keyword with a page link that is unclicked by a user in the search result, and determine that second relevance exists between the search keyword and the page link that is unclicked by the user in the search result, where the first relevance is higher than the second relevance.

The association module 33 is specifically configured to count, for any page link, the number of search keywords associated with the page link, remove repeated search keywords and/or search keywords having a similarity greater than a preset threshold, and determine relevance between a remaining search keyword and the page link.

For the apparatus for acquiring a recommended topic in the embodiment shown in FIG. 3, the technical solutions of the present disclosure are described by using an example in which all the foregoing optional technical solutions are included. In an actual application, all the foregoing optional technical solutions may constitute optional technical solutions of this embodiment of the present invention in any combinable manner, and examples are not provided herein one by one.

The apparatus for acquiring a recommended topic of this embodiment recommends a topic by using the foregoing modules, and has a same implementation mechanism as the foregoing related method embodiment does. For details, reference may be made to the description of the foregoing related method embodiment, which is not described herein again.

It should be noted that: when the apparatus for acquiring a recommended topic provided in the foregoing embodiment recommends a topic, description is only made by using an example of division of the foregoing functional modules. In an actual application, the foregoing functions may be allocated to different functional modules as required for implementation, that is, an internal structure of the apparatus is divided into different functional modules, so as to complete all or a part of functions described above. In addition, the apparatus for acquiring a recommended topic provided in the foregoing embodiment and the embodiment of the method for acquiring a recommended topic belong to a same thought. For a specific implementation process of the apparatus, refer to the method embodiment for detail, and description is not made herein again.

An embodiment of the present invention further provides a server, including the apparatus for acquiring a recommended topic according to any one of the foregoing descriptions. In various embodiments, the server may include a computing device as illustrated in FIG. 4.

A person of ordinary skill in the art may understand that all or some of the steps of the foregoing method embodiments may be implemented by a program instructing relevant hardware. The program may be stored in a non-transitory computer readable storage medium. The storage medium may be a ROM/RAM, a magnetic disk, an optical disc, or the like. According to another embodiment of the present invention, a computer program (including program code) that can execute the disclosed method shown in FIG. 1 runs on a general computing device, such as a computer, including a processing element such as a central processing unit (CPU), a random access memory (RAM), and a read-only memory (ROM) and a storage element, so as to construct the disclosed apparatus shown in FIG. 3, and implement the disclosed method according to the embodiments of the present invention. The computer program may be recorded on the non-transitory computer readable record medium and to perform the methods disclosed herein.

Figure 4:
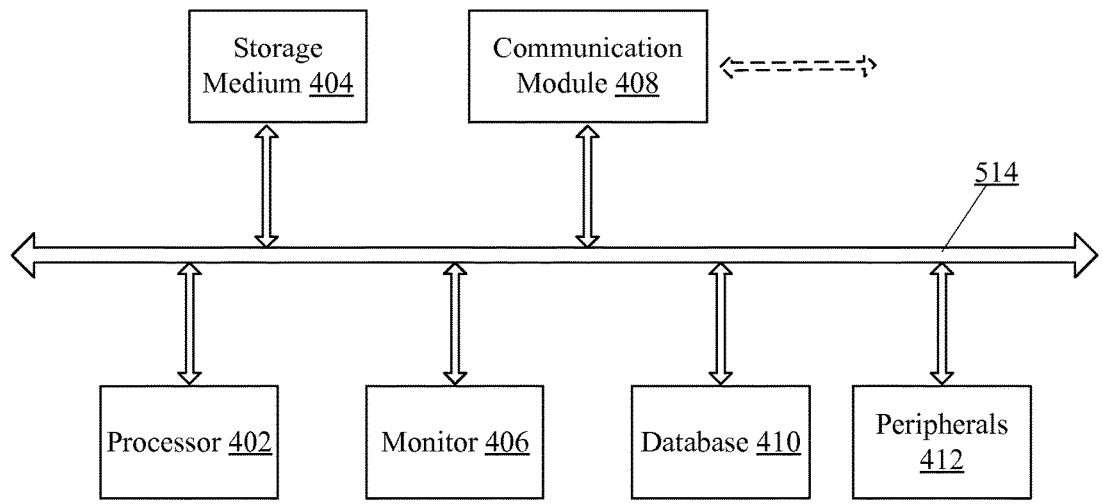
FIG. 4 illustrates an exemplary computing device consistent with the disclosed embodiments.

For example, FIG. 4 illustrates an exemplary computing device capable of implementing the disclosed methods, consistent with the disclosed embodiments. As shown in FIG. 4, the exemplary computing device 400 may include a processor 402, a storage medium 404, a monitor 406, a communication module 408, a database 410, peripherals 412, and one or more bus 414 to couple the devices together. Certain devices may be omitted and other devices may be included.

Processor 402 may include any appropriate processor or processors. Further, processor 402 may include multiple cores for multi-thread or parallel processing. The processor 402 may be used to run computer program(s) stored in the storage medium 404. Storage medium 404 may include memory modules, such as ROM, RAM, and flash memory modules, and mass storages, such as CD-ROM, U-disk, removable hard disk, etc. Storage medium 404 may store computer programs for implementing various disclosed processes, when executed by processor 402. In one embodiment, storage medium 404 may be a non-transient computer-readable storage medium having a computer program stored thereon, when being executed, to cause the computer to implement the disclosed methods.

Further, peripherals 412 may include I/O devices such as keyboard and mouse, and communication module 408 may include network devices for establishing connections, e.g., through a communication network such as the Internet. Database 410 may include one or more databases for storing certain data and for performing certain operations on the stored data, such as webpage browsing, database searching, etc.

In one embodiment, the disclosed wireless communication apparatus may include the computing device illustrated in FIG. 4. For example, the wireless communication apparatus may include one or more processors and a non-transitory computer-readable storage medium having instructions/programs stored thereon, the instructions/programs executed by the one or more processors and comprising the modules and units disclosed in the wireless communication apparatus.

A person of ordinary skilled in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for acquiring a recommended topic, comprising:
    acquiring, according to a link of a current page, a recommended topic associated with a topic of the current page by:
        acquiring a first keyword having a first relevance to the link of the current page, wherein the first keyword having the first relevance is a keyword used when the current page is a clicked search result through a search engine,
        determining whether a first number of the acquired first keywords having the first relevance is greater than a first preset value,
        when the first number of the acquired first keywords is greater than the first preset value, using the acquired first keywords as the recommended topic associated with the topic of the current page,
        when the first number of the acquired first keywords is not greater than the first preset value, acquiring a second keyword having a second relevance to the link of the current page, wherein the second keyword having the second relevance is not the keyword used when the current page is the clicked search result through the search engine,
        determining whether a sum of the first number of the acquired first keywords and a second number of the acquired second keywords is greater than a second preset value,
        when the sum is greater than the second preset value, using the acquired first and second keywords as the recommended topic associated with the topic of the current page,
        when the sum is not greater than the second preset value,
            acquiring a third keyword having a third relevance to the link of the current page, wherein the third keyword having the third relevance is a recommended topic of a page related to the current page, and
            using the acquired first, second and third keywords as the recommended topic associated with the topic of the current page; and
    displaying the recommended topic on the current page.

2. The method according to claim 1, wherein the acquiring, according to the link of the current page, the recommended topic associated with the topic of the current page further comprises:
    acquiring a fourth keyword having a fourth relevance to the current page, wherein the fourth keyword having the fourth relevance is a keyword extracted from content of the current page according to a preset rule.

3. The method according to claim 1, wherein the step of using at least one of the first and second keywords as the recommended topic associated with the topic of the current page comprises:
    removing, from the acquired first and second keywords, repeated keywords and keywords having a similarity greater than a preset threshold, and
    using a remaining keyword as a recommended topic associated with the topic of the current page.

4. The method according to claim 1, wherein, before the acquiring, according to the link of the current page, the recommended topic associated with the topic of the current page, the method further comprises:
    associating, when a search is performed according to a search keyword, the search keyword with a page link of a search result, and
    determining a relevance between the search keyword and the page link of the search result.

5. The method according to claim 4, wherein:
    the first relevance is higher than the second relevance, and
    the steps of associating the search keyword with the page link of the search result, and determining the relevance between the search keyword and the page link of the search result comprise:
        associating, when the search is performed according to the search keyword, the search keyword with the page link that is clicked by a user in the search result, and determining that the first relevance exists between the search keyword and the page link that is clicked by the user in the search result; and
        associating, when the search is performed according to the search keyword, the search keyword with the page link that is unclicked by a user in the search result, and determining that the second relevance exists between the search keyword and the page link that is unclicked by the user in the search result.

6. The method according to claim 4, wherein the steps of associating the search keyword with the page link of the search result, and determining the relevance between the search keyword and the page link of the search result comprise:
  counting, for any page link, the number of search keywords associated with the page link, removing repeated search keywords and search keywords having a similarity greater than a preset threshold, and determining the relevance between a remaining search keyword and the page link.

7. An apparatus for acquiring a recommended topic, comprising:
  a memory;
  a processor coupled to the memory, the processor is configured to
  acquire, according to a link of a current page, a recommended topic associated with a topic of the current page, comprising:
    acquire a first keyword having a first relevance to the link of the current page, wherein the first keyword having the first relevance is a keyword used when the current page is a clicked search result through a search engine,
    determine whether a first number of the acquired first keywords having the first relevance is greater than a first preset value,
    when the first number of the acquired first keywords is greater than the first preset value, use the acquired first keywords as the recommended topic associated with the topic of the current page,
    when the first number of the acquired first keywords is not greater than the first preset value, acquire a second keyword having a second relevance to the link of the current page, wherein the second keyword having the second relevance is not the keyword used when the current page is the clicked search result through the search engine,
    determine whether a sum of the first number of the acquired first keywords and a second number of the acquired second keywords is greater than a second preset value,
    when the sum is greater than the second preset value, use the acquired first and second keywords as the recommended topic associated with the topic of the current page,
    when the sum is not greater than the second preset value,
      acquire a third keyword having a third relevance to the link of the current page, wherein the third keyword having the third relevance is a recommended topic of a page related to the current page, and
      use the acquired first, second and third keywords as the recommended topic associated with the topic of the current page; and
  display the recommended topic on the current page.

8. The apparatus according to claim 7, wherein the processor is further configured to:
  acquire a fourth keyword having a fourth relevance to the current page, wherein the fourth keyword having the fourth relevance is a keyword extracted from content of the current page according to a preset rule.

9. The apparatus according to claim 7, wherein the processor is further configured to remove, from the acquired first and second keywords, repeated keywords and keywords having a similarity greater than a preset threshold, and using a remaining keyword as a recommended topic associated with the topic of the current page.

10. The apparatus according to claim 7, wherein the processor is further configured to associate, when a search is performed according to a search keyword, the search keyword with a page link of a search result, and determine a relevance between the search keyword and the page link of the search result.

11. The apparatus according to claim 10, wherein:
  the first relevance is higher than the second relevance,
  the processor is further configured to associate, when the search is performed according to the search keyword, the search keyword with the page link that is clicked by a user in the search result, and determine that the first relevance exists between the search keyword and the page link that is clicked by the user in the search result; and
  the processor is further configured to associate, when the search is performed according to the search keyword, the search keyword with the page link that is unclicked by a user in the search result, and determine that second relevance exists between the search keyword and the page link that is unclicked by the user in the search result.

12. The apparatus according to claim 10, wherein the processor is further configured to count, for any page link, the number of search keywords associated with the page link, remove repeated search keywords and search keywords having a similarity greater than a preset threshold, and determine the relevance between a remaining search keyword and the page link.

13. A non-transitory computer readable storage medium comprising a computer readable program stored thereon, wherein, when being executed, the computer readable program causes one or more processors to implement a method for acquiring a recommended topic, the method comprising:
  acquiring, according to a link of a current page, a recommended topic associated with a topic of the current page by:
    acquiring a first keyword having a first relevance to the link of the current page, wherein the first keyword having the first relevance is a keyword used when the current page is a clicked search result through a search engine,
    determining whether a first number of the acquired first keywords having the first relevance is greater than a first preset value,
    when the first number of the acquired first keywords is greater than the first preset value, using the acquired first keywords as the recommended topic associated with the topic of the current page,
    when the first number of the acquired first keywords is not greater than the first preset value, acquiring a second keyword having a second relevance to the link of the current page, wherein the second keyword having the second relevance is not the keyword used when the current page is the clicked search result through the search engine,
    determining whether a sum of the first number of the acquired first keywords and a second number of the acquired second keywords is greater than a second preset value, when the sum is greater than the second preset value, using the acquired first and second keywords as the recommended topic associated with the topic of the current page, when the sum is not greater than the second preset value, acquiring a third keyword having a third relevance to the link of the current page, wherein the third keyword having the third relevance is a recommended topic of a page related to the current page, and using the acquired first, second and third keywords as the recommended topic associated with the topic of the current page; and displaying the recommended topic on the current page.

14. The storage medium according to claim 13, wherein the acquiring, according to the link of the current page, the recommended topic associated with the topic of the current page further comprises:

acquiring a fourth keyword having a fourth relevance to the current page, wherein the fourth keyword having the fourth relevance is a keyword extracted from content of the current page according to a preset rule.

15. The storage medium according to claim 13, wherein the step of using at least one of the first and second keywords as the recommended topic associated with the topic of the current page comprises:

removing, from the acquired first and second keywords, repeated keywords and keywords having a similarity greater than a preset threshold, and using a remaining keyword as a recommended topic associated with the topic of the current page.

16. The storage medium according to claim 13, wherein, before the acquiring, according to the link of the current page, the recommended topic associated with the topic of the current page, the method further comprises:

associating, when a search is performed according to a search keyword, the search keyword with a page link of a search result, and determining a relevance between the search keyword and the page link of the search result.

17. The storage medium according to claim 16, wherein: the first relevance is higher than the second relevance, and the steps of associating the search keyword with the page link of the search result, and determining the relevance between the search keyword and the page link of the search result comprise:

associating, when the search is performed according to the search keyword, the search keyword with the page link that is clicked by a user in the search result, and determining that the first relevance exists between the search keyword and the page link that is clicked by the user in the search result; and associating, when the search is performed according to the search keyword, the search keyword with the page link that is unclicked by a user in the search result, and determining that the second relevance exists between the search keyword and the page link that is unclicked by the user in the search result.

* * * * *